Feb. 10, 1942.  C. T. JACOBS  2,272,975
CONTROL SYSTEM
Filed May 23, 1940  2 Sheets-Sheet 1
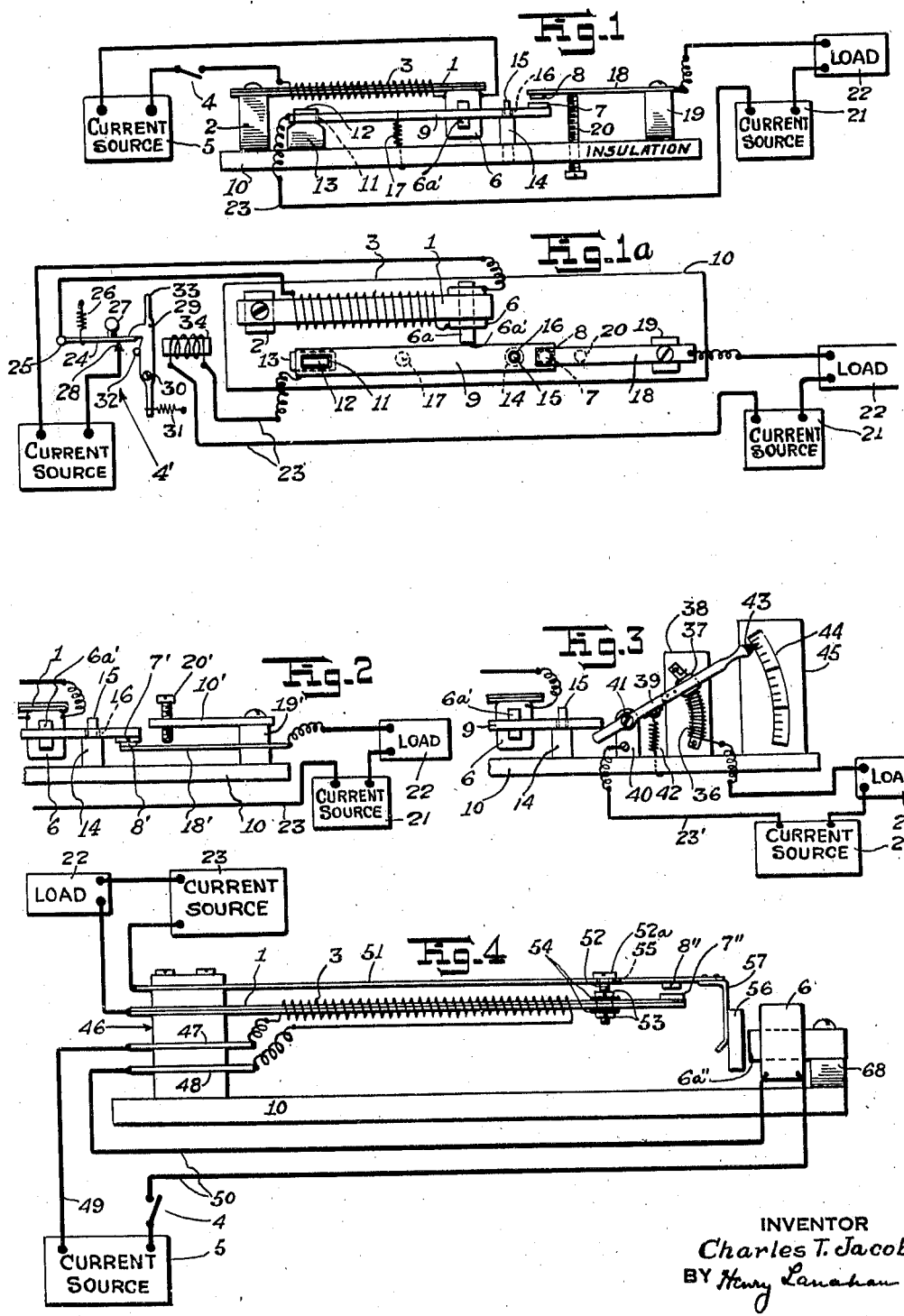
INVENTOR
Charles T. Jacobs
BY Henry Lanahan
ATTORNEY Feb. 10, 1942.    C. T. JACOBS    2,272,975
CONTROL SYSTEM
Filed May 23, 1940    2 Sheets-Sheet 2
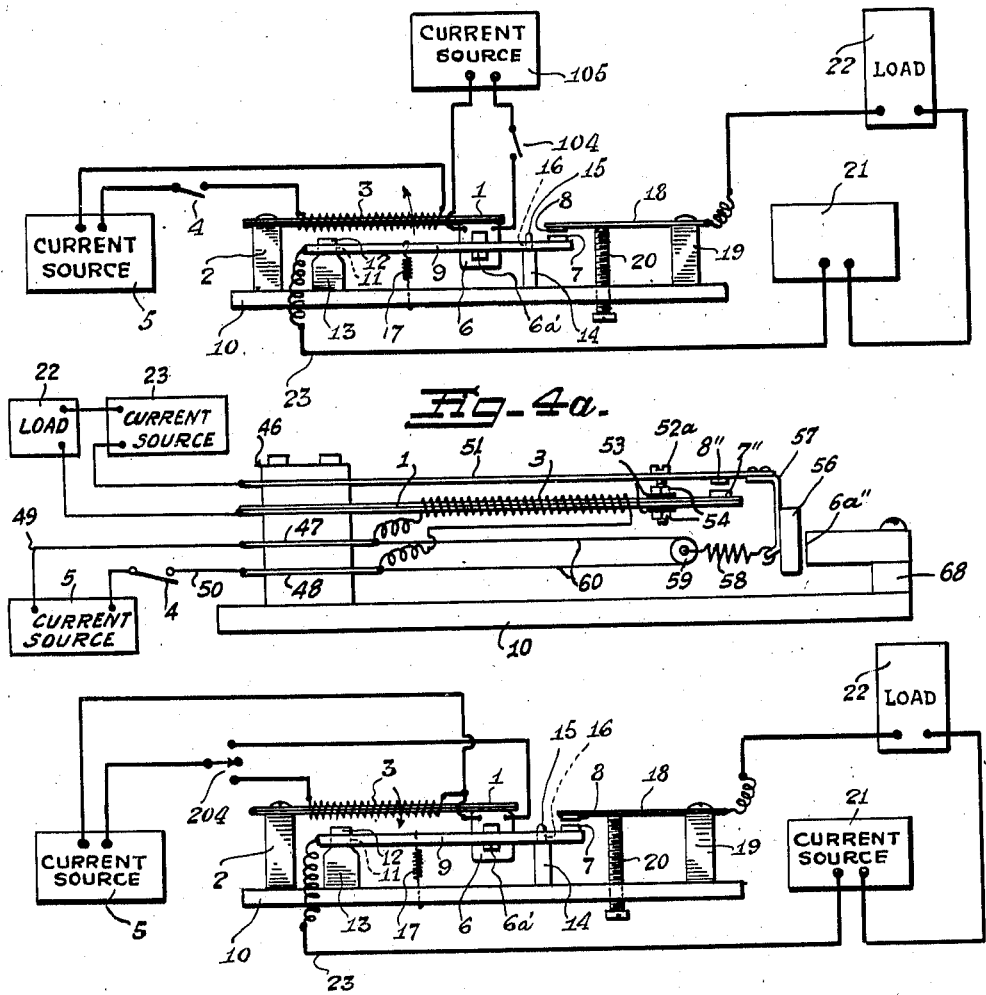
Inventor
Charles T. Jacobs
By Henry Lanahan
Attorney Patented Feb. 10, 1942

2,272,975

UNITED STATES PATENT OFFICE 2,272,975

CONTROL SYSTEM

Charles T. Jacobs, New Providence Township, Union County, N. J., assignor to Thomas A. Edison, Incorporated, West Orange, N. J., a corporation of New Jersey Application May 23, 1940, Serial No. 336,873

23 Claims. (Cl. 200—122)

This invention relates to control systems and especially, though not in all aspects limitatively, to systems for electrical control.

The invention has particular reference to control systems whose operation involves the accumulation of energy, for example of heat, in an energy-storing device which in turn forms an operating element of the system; and it is an object of the invention to provide a generally improved system of that type.

An important aspect of the invention is peculiar to systems, of relay nature for example, which produce their control action at the expiration of a time interval or delay following an initial manipulation; and it is an object of the invention to provide a generally improved such system.

It is another object to provide an improved control or relay system of the delayed-action type just mentioned, characterized by substantial uniformity of the delay intervals in all normal, though rapid, use.

It is another object to provide such a system which may be operated a number of times, or re-cycled, in quick succession without substantial change of its delay interval.

It is another object to provide such a system which may be operated immediately following a prior incompleted operation, with its normal delay interval.

It is another object to provide a system operatively including an energy-storing device, with which quickly repeated but substantially uniform re-cycling may be effected.

It is another object to provide a control system operatively including an energy-storing device, which may be operated with uniform action substantially independently of the level of energy contained in that device.

Still another object is to provide a control system whose ultimate or output control means are responsive in novel manner to other elements of the system.

Yet another object is to provide a control system whose ultimate control means are only at advantageous times responsive to other elements of the system.

Other and allied objects will more fully appear from the following description and the appended claims.

In the description reference is had to the accompanying drawings, of which:

Figure 1 is an elevational view of the principal portion of a control system according to my invention, further portions of the system appearing therein schematically;

Figure 1a is a plan view of the same principal system portion, together with a schematic showing of further portions slightly elaborated over the showing of Figure 1;

Figure 2 is an elevational and schematic view intended for optional substitution for the right-hand portion of Figure 1, illustrating a modification of certain components;

Figure 3 is an elevational and schematic view likewise intended for optional substitution for the right-hand portion of Figure 1, and illustrating a further modification of certain components;

Figure 4 is a principally elevational but partly schematic view of a control system according to my invention but modified from those of earlier figures in many respects;

Figure 4a is a view similar to Figure 4 but illustrating still further modifications; and Figures 5 and 6 are views each generally similar to Figure 1 but respectively illustrating further modifications of the invention.

Figures 1 and 1a, which illustrate a simple embodiment of my invention with the components disposed without effort at compactness, may be referred to for an understanding of the basic principles involved. In these figures 1 represents a bimetallic strip, composed in the usual way of two metals of dissimilar thermal coefficients of expansion, clamped at one extremity as to a standard 2 on insulating base 10; it will be understood that this strip will bend generally arcuately, for example upwardly at its free extremity, as its temperature is raised. Broadly, this strip represents an energy-storing device, positionally responsive to its own energy (heat) content; and in association therewith I provide means operable at will to vary that energy content—e. g., for supplying, or creating a flow of, energy thereto. This means appears as the heating winding or resistance 3 wound about the strip 1 over a considerable portion of the length of the strip; this winding may be connected, through control switch 4 for example, to the battery or other electric current source 5.

The control members proper appear in Figure 1 as the contacts 7 and 8. Contact 7 is shown carried on top of a rectangularly cross-sectioned arm 9 near one extremity of the arm, the other arm extremity being provided with the vertical slot 11 fitting slightly loosely over the vane 12, which latter extends vertically upward from a standard 13 secured to the base 10. For the contact extremity of the arm 9 there may be provided a down-stop in the form of a post 14 secured to the base, a small pin 15 rising centrally from the top of the post 14 to pass through a slightly oversize hole 16 in the arm 9. A spring 17 terminally secured to the base 10 and to the arm 9 intermediately of the standard 13 and post 14 may, in addition to gravity, serve to bias the arm downwardly into contact with the tops of that standard and that post.

Contact 8 is carried, vertically above contact 7, on the bottom of a leaf spring 18 near one extremity of the spring, the other spring extremity being secured to a standard 19 on base 10. The spring 18 may be downwardly biased; but it may be limited in downward movement, as by an adjustable screw 20 passing upwardly through the base, to a position wherein contact 8 is predeterminedly slightly spaced above contact 7 so long as arm 9 contacts the top of post 14. The control means are normally maintained in this predetermined mutual relationship by the various biasing and stop means above described, independent of the level of energy content (temperature) and hence position of the bimetallic strip 1; the control member system may accordingly be arranged, as seen in Figure 1a, at the side of rather than integrally with the bimetallic strip.

I may make the control members, in respect of their mutual relationship, variationally responsive to the energy content (temperature) and hence position of the energy-storing device 1 only during certain periods of variation of that energy content—e. g., during periods of operation of the energy-varying or supplying means described above. In doing this I may render the relationship-maintaining means inoperative simultaneously with the operation of the energy-varying means—more specifically, in the structure of Figures 1–1a, by then coupling the arm 9 to the bimetallic strip, so that the movement of the strip moves the arm 9 upwardly in disobedience to the bias of spring 17 and gravity. This may be accomplished for example by securing underneath the strip 1 an electromagnet 6, of which the core 6a has an end 6a' immediately adjacent the side of the arm 9 (between spring 17 and post 14) and overlapping the arm side in vertical dimension; and by connecting this electrically in common (series or parallel) with the strip-heating winding 3.

It will be understood that upon closing of the switch 4 to supply heat energy to the strip 1, the electromagnet 6 will simultaneously be energized and will attract the arm 9 to move into intimate contact with the pole end 6a' (which that arm can do by virtue of its free fit about vane 12 and about pin 15); and as the strip 1 moves upwardly more or less slowly with its rising temperature, it will carry with it the arm 9—the arm pivoting on standard 13 and moving upwardly in its contact 7 extremity in view of the bias of spring 17. It is not important just what elevation the strip 1 and magnet 6 may have at the time of switch closing, the pole end 6a' preferably having a vertical dimension large enough so that some portion of that end will always be in horizontal juxtaposition to the side of arm 9. And so long as the temperature of the strip 1 at the time of switch closing is any temperature, within a wide range, which causes a given small strip movement to require substantially the same interval of current flow, closing of the contacts 7 and 8 will result at an interval after current initiation which is substantially independent of initial strip temperature—i. e., of the general level of the energy in the storing device. It is to be noted that in obtaining this desirable result I employ a variational response of the control members to only one energy-storing device or bimetallic strip, and not a response differentially to two storing devices (bimetallic strips or the like) as in some known and quite distinct systems.

The operation or closing of the control members 7, 8 may be of course utilized for any desired purpose; schematically I have illustrated them connected in a series circuit with a current source 21 and load 22 (contact 7 through arm 9 and conductor 23, and contact 8 through spring 18), so that they serve to control the flow of current from that source through that load.

Of course in a typical use of the structure of Figure 1 it may be desired to discontinue the flow of heating current through the winding 3 when or shortly after the contacts 7, 8 have closed; in the circuit of Figure 1 this discontinuance may be effected when desired simply by opening of the switch 4. To illustrate, however, the equal availability of my invention for use with automatic discontinuing means, I have modified the schematic portion of Figure 1a from that of Figure 1 to include such automatic means. Thus in this figure the simple switch 4 is replaced by a switch generally designated as 4' and comprising the pole 24 pivoted at 25 and upwardly biased as by spring 26, but movable downwardly as by knob 27 to close against contact 28. When so closed it may be held in that position by being then engaged by a latch 29, pivoted as at 30 and biased as by spring 31 into such engagement (or, when the pole is raised, against stop 32). For manually opening the switch 4' at any desired time there may be provided on the latch a knob 33, by which it may be disengaged from the pole 24. There is associated with the latch, however, an additional latch-disengaging (and hence switch-opening) means; and this additional means is made automatically responsive to the closing of contacts 7, 8. This means may consist simply in an electromagnet 34 positioned to disengagingly attract the latch, and connected in series with the load circuit—e. g., serially in the conductor 23. The use of such automatic means is not only conservative of energy from the source 5, but also helps to obviate excessive heating of the strip or energy-storing device 1—e. g. helps to maintain a more nearly average energy level therein.

It is to be appreciated, however, that even in the event of the use of such means as shown in Figure 1a, the temperature or energy content of the device 1 will not always be the same at the time of closing of the switch 4 or 4'; that content will for example be higher than usual, in the case of switch closing (re-closing) so soon after a prior operation of the system that gradual energy losses (e. g., conduction, convection and radiation cooling) have not had an opportunity to return the strip 1 to ambient temperature, or in the case of switch re-closing immediately or soon after a prior switch closure deliberately interrupted before operation of the contacts 7, 8. In all the known control systems of which I am aware such an early re-closing of the switch, or analogous re-cycling manipulation of the system, causes the operation of the control members after a time interval which is substantially altered or shortened—in some cases practically to zero—from that interval of operation which normally characterizes the system. One of the most important benefits of a system according to my invention is its ability to be used a second or succeeding time—i. e., recycled—just as soon as desired after a prior use or incompleted use, without any substantial alteration of the operation interval.

This results from the fact that immediately upon interruption of the energy supply to the device 1 (e. g., the opening of switch 4 or 4')— whether that interruption occurs before, with or after the closing of contacts 7 and 8—the arm 9 will be released by the electromagnet 6 and will be immediately returned in response to spring 17 to its normal position of contact with the top of post 14, restoring the normal spaced relationship of the contacts. However soon the energy supply to device 1 may be resumed by reclosing of switch 4 or 4', the arm 9 will be attracted to contact the pole face 6a' in a fresh position, and the operation of the system repeated with the normal time inerval. Of course there may be an ultimate limit to the number of re-cycling operations which can be performed in immediate succession—for one reason, because the strip 1 will eventually advance upwardly to a position such that pole face 6a' is no longer in juxtaposition with the arm 9; such a limitation is of very infrequent significance, however, in almost all practical cases.

It will of course be understood that I use the phrase "control members" or "control means" in a very broad sense, intending no limitation thereof to contacts arranged to be closed against each other by operation of the system. Purely by way of alternative illustration, I have shown in Figure 2 a modification of the right-hand portion of Figure 1 wherein two contacts, 7' and 8', are maintained normally in contact with each other under some pressure, and are opened by a predetermined upward movement of the arm 9 (just as contacts 7 and 8 of Figures 1–1a were closed). The contact 7' may be carried underneath instead of on top of the arm 9 near its right-hand extremity; and the contact 8' may be carried on top of a leaf spring 18' clamped in the rigid stack 19' and lightly upwardly biased so that contacts 7' and 8' touch each other with light pressure when arm 9, in obedience to its bias, rests on the top of post 14. When arm 9 rises, due to an action entirely similar to that occurring in the case of Figure 1, spring 18' and contact 8' will rise correspondingly for a slight distance, until spring 18' contacts the bottom of an adjustable screw 20' passing downwardly through a rigid plate 10' secured to the top of stack 19'. Further upward movement of arm 9 and contact 7' will not be accompanied by any further contact 8' movement, and the contacts will be opened from each other; upon restoration of arm 9 to its normal illustrated position, occurring for example suddenly as in the case of Figure 1, the contacts will be abruptly returned to their normal described and illustrated mutual arrangement. These contacts may for example be connected in a load circuit similar to that of Figure 1.

Further, I intend no limitation of the control members or means to discrete opening and closing contacts. So in Figure 3 by way of further example I have illustrated a control means in the form of a rheostat member 36 and a contacting shoe or member 37 therefor; the rheostat member 36 may be secured against an insulating standard 38, and the contact member 37 to a conductive rod 39 pivoted as at 41 to a conductive standard 40. Near the pivot on the far side thereof from the contact shoe or member 37, the rod 39 may pass under the extremity of arm 9, and may be urged upwardly thereagainst by a spring 42 lightly biasing the rod downwardly on the shoe side of the pivot. It will be understood that as the arm 9 rises, due to an action entirely similar to that of Figure 1, the rod 39 will rotate clockwise about its pivot, varying (decreasing for example) the resistance of the rheostat member 36 between one of its extremities (the bottom for example) and the contact shoe 37, at a rate determined by the rate of arm 9 movement; and that upon sudden restoration of arm 9 to its normal illustrated position, occurring as in the case of Figure 1, the rod 39 will substantially instantaneously return to its normal illustrated position. The bottom extremity of the rheostat member 36, and the contact shoe or member 37 (through rod 39, standard 40 and conductor 23'), may for example be connected in a load circuit similar to that of Figure 1.

I do not even intend any unnecessary limitation of the control means to electrical ones; they may be purely mechanical; and they may for example perform their control function through the medium of the intelligence of an observer. Thus in Figure 3 I have additionally shown a pointer 43 disposed at the outer extremity of the rod 39 and operating over a scale 44 on a standard 45, thereby indicating the position of arm 9. An apparatus of this character may for example be employed to indicate, for one or another ultimate control purpose, the length of time elapsed from the time of closing of the switch 4 or 4'. It will of course be understood that the rheostat and shoe members 36 and 37 are not necessarily present jointly with 43—44—45.

In respect of the organization of principal elements my invention is capable of wide modification from the form shown in figures so far described; and Figure 4 illustrates a typical reorganization. Herein the bimetallic strip is again designated as 1, but is clamped in the insulating stack 46 secured to base 10. Again the strip carries the heating winding 3, which has, however, been shown conveniently terminally connected to two mutually insulated lugs 47 and 48 in the stack 46—the current source 5 and switch 4, again mutually in series, being again connected across the winding but through the medium of these lugs and conductors 49 and 50. In this modification the strip 1 itself may carry one of the contacts 7", for example on its top near its free extremity; the other contact, 8", above contact 7", is carried on the bottom of a leaf spring 51 near one spring extremity, the other spring extremity being clamped in the stack 46.

To maintain the contacts normally in a predetermined relationship the spring 51 is upwardly biased, and stop means secured to the strip 1 operate on the spring to limit its upward movement to a position, relative to strip 1, which results in slight spacing of the contacts 7" and 8". These stop means have been illustrated as an adjustable screw 52 having a bottom extremity clamped in the strip 1 as by nuts 53 and insulating bushings 54, and passing upwardly through a slightly oversize hole 55 in spring 51 to terminate in a head 52a against the bottom of which the spring 51 normally bears.

Whereas in the structure of earlier figures neither contact may be moved by strip 1 during periods of no current flow through the winding 3, in the present structure both contacts may be moved, but simultaneously, by strip 1 during no-flow periods, as in cooling of that strip; during periods of current flow in either structure, however, one contact is moved by strip 1 and the other maintained stationary. In the present structure the rendering of contact 8" stationary during current flow periods (i. e., the rendering inoperative of the normal spacing-maintaining means 52—53—54 etc.) is accomplished by associating with spring 51 only (and hence with contact 8") means which couple it during current flow periods to a rigid element—broadly corresponding to the means in the Figure 1 structure which during current flow periods coupled the arm 9 and contact 7 to the strip 1. The present means may be provided electromagnetically if desired, as by an armature 56 down-hung from the extremity of the spring 51 through the medium of a vertical, light leaf spring 57, secured to spring 51 and flexible transversely but not longitudinally (vertically); and by an electromagnet 6' having the pole face 6a" in minute spaced relationship to the normal position of the side of armature 56. The electromagnet 6' may be secured to base 10 as through a standard 68, and may be electrically connected serially in the conductor 50 (analogously to the connection of electromagnet 6 in Figure 1). It will of course be understood that upon energization of the electromagnet 6' (simultaneously with current flow through winding 3) the armature 56 will be attracted over into contact with pole face 6a", blocking further upward movement of the spring 51 and contact 8"; the contact 7", continued in upward movement by the rising temperature of the strip 1, will close against contact 8" after the pretetermined time interval. Upon de-energization of the electromagnet the spring 51 will immediately obey its bias, restoring the illustrated contact spacing and so forthwith preparing the system for an immediate re-cycling.

Subject to such rather nominal operational distinctions as have already been brought out, and in spite of its material difference in arrangement, the system of Figure 4 as so described operates quite similarly to that of Figure 1, and performs all its beneficial functions; and it is accordingly thought here unnecessary further to detail its operation. It may, however, be noted that in the system of Figure 1 the arms 9 and 18 with their respective contacts constitute a control device, in which the arm 9 forms the means which operates that device in response to joint or concomitant energizations of the electro-thermal and coupling devices (1—3 and 6, respectively); while in the system of Figure 4 the arms 1 and 51 with their respective contacts may constitute the control device, in which these two arms jointly form the means which operate that device in response to joint or concomitant energizations of the electro-thermal and coupling devices (1—3 and 6'—56, respectively).

The control means, or contacts 7" and 8", of Figure 4 have been shown connected, by way of example, through strip 1 and spring 51 respectively into a load circuit similar to that of Figure 1. It is, however, to be fully understood that the control means in the structural arrangement of Figure 4 are just as susceptible of modifications in nature and use as those in the structure of Figure 1 were of modifications—such as illustrated in other figures herein.

In respect of the coupling means, operative on one of the control members in each of the illustrated embodiments of my invention, I intend no limitation to electromagnetic action. To illustrate the availability of other actions in such coupling means I have illustrated in Figure 4a a coupling by thermal action. It will be seen that this figure illustrates a system, by way of example, generally quite similar to that of Figure 4, and whose details need not therefore be described excepting for the revised coupling means. Thus there will be seen secured to the armature 56 on its stack-ward side a spring 58 terminating in an insulating spool 59; terminally secured to lug 47, passing around this spool, and at its other terminal secured to lug 48, is to be seen a fine resistance wire 60. The longitudinal tension of 60—59—58 is of course balanced against some force in spring 57 tending to move armature 56 rightwardly, when the parts are in normal position as shown. By virtue of the connection of wire 60 in parallel with the winding 3, current will of course flow through it at the same time as through the winding; and the wire 60 is such that this flow therethrough appreciably heats and lengthens it, so that the armature 56 moves rightwardly into tight contact with the face 6a"—which of couse for this action need be only the face of any stationary member. This contact has of course the same function as the analogous contact which was electromagnetically produced in the embodiment of Figure 4.

While I intend no unnecessary limitation thereto, I point out that the coupling means which I have specifically disclosed operate frictionally—i.e., they develop between the immediately coupled members a degree of friction which other forces developed in the system are unable to overcome.

While I have disclosed preferred embodiments of my invention in which the energizations of the energy-storing (e. g., electro-thermal) and coupling devices are concomitant, certain aspects of my invention are not necessarily limited to this feature. For certain purposes the energizations may advantageously be separately controlled. This has been schematically illustrated in Figure 5—a modification of the Figure 1 structure in the respect that the electromagnet 6 is electrically removed from the circuit of the heater winding 3, and is supplied with current through a separate switch 104, if desired from a separate current source 105. In such a case broadly, the final control means (e. g., 7—8) will be operated when, during any period of coupling device energization, the energy supplied to the storing (e. g., electro-thermal) device less any losses therefrom (whether the latter energy supply be continuous or intermittent) has reached a predetermined value. The switches 104 and 4 will of course respectively control the coupling device and the energy supply to the storing means appropriately to the ultimate control function to be performed by the system.

It will also be understood that if desired the energy or temperature change during which the coupling means is operated may be a loss from the storing or electro-thermal device, rather than a supply thereto. This I have schematically illustrated in Figure 6—a modification of the Figure 1 structure in the respects that the bimetallic strip 1 is intended to move downwardly with heating, and that current may be supplied from source 5 thru switch 204 selectively to the heater winding 3, to the electromagnet 6, or to neither. Assuming the bimetallic strip to have first been heated sufficiently (as by current from source 5 thru the switch 204 downwardly thrown), an upward throw of switch 204 to energize the coupling means will cause the operation of the control means 7—8 at the expiration of a predetermined strip-cooling interval.

And it will further be understood that no unnecessary limitation is intended as to the means which supplies energy or heat to the energy-storing or thermal device. In suitable cases this might, for example, be simply the environment of the device, its temperature being subjected to variation on one account or another and in turn exercising its ambient influence on the device.

While I have disclosed my invention in terms of particular embodiments thereof, and with features variously grouped in the several embodiments, I intend no unnecessary limitations by virtue of the details of those embodiments, nor any restriction to particular groupings of features obviously otherwise groupable; rather in the appended claims I undertake to express the scope of my invention broadly, limited only by the state of the art. There is made herein, however, no claim specific to the structure of either or both of Figures 4 and 4a (i. e., no claim not also reading on one or more of the structures of figures other than these two), such claims being made in the co-pending application of Charles D. Geer, Serial No. 336,894, filed May 24, 1940 and assigned to the assignee of this application.

This application is filed as a continuation in part of my co-pending application Serial No. 128,219, filed February 27, 1937.

I claim:

1. A control system comprising, in combination, control means having a normal condition; means, operable at will and including a thermal device, for slowly varying said control means to an operated condition, such variation from said normal condition requiring a predetermined interval of time; and means, responsive to interruption of any operation of said varying means, for substantially instantaneously restoring said control means to said normal condition.

2. A control system comprising, in combination, a thermal device whose temperature may be varied; means arranged for operation on said device to vary said temperature; control means responsive after a predetermined substantial delay to an initial operation of said varying means; and means associated with said control means for rendering the same responsive with a substantially identical delay to an operation of said temperature-varying means on the same thermal device repeated with negligible delay following cessation of said initial operation.

3. A control system comprising, in combination, control means normally having a predetermined condition; an electrically energizable thermal device; means rendering any energization of said one device effective to relatively slowly operate said control means from said predetermined condition; and means, rendered effective by the deenergization of said device, for substantially instantaneously restoring said control means to said predetermined condition.

4. A control system comprising, in combination, an energy-storing device positionally responsive to its own energy content; control means; means energizable to mechanically couple said control means with said device; and means for simultaneously varying the energy content of said device and energizing said coupling means.

5. A control system comprising, in combination, a thermal device positionally responsive to temperature; control means; means energizable to mechanically couple said control means with said device; and means for simultaneously varying the temperature of said device and energizing said coupling means.

6. A control system comprising, in combination, a thermal device positionally responsive to temperature; control means; electromagnetic means for mechanically coupling said control means with said device; and electrical means for simultaneously heating said device and energizing said electromagnetic means.

7. A control system comprising, in combination, a bimetallic member; a switch; means operable to mechanically couple said switch with said bimetallic member; and means for concomitantly heating said bimetallic member and operating said coupling means.

8. A control system comprising, in combination, a movable control member; an electrically energizable thermal device; and means, electrically connected with said thermal device for energization concomitantly therewith, for coupling said control member with said thermal device for movement thereby.

9. A control system comprising, in combination, coacting control members; a device positionally responsive to its own energy content adapted to move one of said members; means normally maintaining a predetermined mutual relationship of said members independent of the level of said energy content; and means for simultaneously varying the energy content of said device and rendering said maintaining means inoperative.

10. A control system comprising, in combination, coacting control members; a thermal device positionally responsive to temperature adapted to move one of said members; means normally maintaining a predetermined mutual relationship of said members independent of the temperature of said device; and means for simultaneously varying the temperature of said device and rendering said maintaining means inoperative.

11. In a control system including control means to be operated: the combination of an electrically energizable thermal device, and means electrically energizable to mechanically couple said control means with said thermal device, said thermal device and coupling means being electrically inter-associated for concomitant energization.

12. In a control system including a control device to be operated: the combination of an electrically energizable thermal device and an electrically energizable mechanical coupling device each adapted to influence said control device, and operating means in said control device responsive only to concomitant energizations of said thermal and coupling devices.

13. In a control system including a control device having relatively movable members: the combination of electrically energizable means for frictionally engaging one of said members; and an electrically energizable thermal device, electrically connected with said engaging means for energization when said engaging means is energized, for moving one of said members.

14. Means for operating a control device, comprising, in combination, electrically energizable means for clutching a portion of the control device; and electro-thermal means, energized concomitantly with said engaging means, for operating the device while said portion is clutched.

15. Means for operating a control device, comprising, in combination, an electro-thermal element and electrically actuable means for clutching a portion of the control device during the operation of the device, said means being carried by and electrically connected with said element.

16. Means for operating a control device, comprising, in combination, a thermal element moved in accordance with variations of temperature and electrically actuable means for clutching a portion of the control device during the operation of the device, said means being carried by said element.

17. A control system comprising a thermal device adapted for bidirectional movement in accordance with variations of its temperature; control means comprising coacting control members; and coupling means effective on one of said members and electrically operable to render said control means directly responsive to the variation of the temperature of said device occurring during the coupling means operation.

18. A control system comprising an electro-thermal device adapted for heating and cooling upon the supply and cessation of current thereto and for bidirectional movement in accordance with variations of its temperature; control means comprising coacting control members; and coupling means effective on one of said members and electrically operable to render said control means directly responsive to the variation of the temperature of said device occurring during the coupling means operation.

19. A circuit breaker including, in combination, an operating mechanism which includes a thermal responsive element which deflects under the influence of heat thereby effecting operation of said circuit breaker, means for resetting said circuit breaker while said thermal responsive element is still in its deflected position, and means responsive to continued deflection of said same thermal responsive element from said deflected position for effecting by means of the same operating mechanism a second operation of said circuit breaker.

20. Means for operating an electrical switch, including, in combination, an operating mechanism which includes a thermal responsive element which deflects under the influence of heat thereby effecting operation of said switch, means for resetting said switch while said thermal responsive element is still in its deflected position, and means responsive to continued deflection of said same thermal responsive element from said deflected position for effecting by means of the same operating mechanism a second operation of said switch.

21. A thermal relay including, in combination, a thermal responsive operating mechanism which includes a thermal responsive element which is operated under the influence of heat to effect operation of said relay, means for resetting said relay to its inoperative position while said thermal responsive element is still in said operated position and means responsive to continued operation of said same thermal responsive element from said operated position for tripping said resetting means thereby effecting a second operation of said relay.

22. A current responsive circuit breaker which includes a plurality of contact members and an operating mechanism therefor, said operating mechanism including a thermal responsive element which deflects under the influence of heat developed by current, a relay circuit which is closed in response to said deflection of said thermal responsive element, said plurality of circuit breaker contact members being operable in response to closure of said relay circuit, means for resetting said circuit breaker contact members to the closed position and for opening said relay circuit while said thermal responsive element is still in its deflected position, and means responsive to continued deflection of said same thermal responsive element from said deflected position for effecting by means of the same operating mechanism a second closure of said relay circuit thereby effecting a second opening of said circuit breaker contact members.

23. Means for operating a switch which includes a plurality of contact members, comprising an operating mechanism including a thermal responsive element which deflects under the influence of heat developed by current, a relay circuit which is closed in response to said deflection of said thermal responsive element, said plurality of switch contact members being operable in response to closure of said relay circuit, means for resetting said switch contact members and for opening said relay circuit while said thermal responsive element is still in its deflected position, and means responsive to continued deflection of said same thermal responsive element from said deflected position for effecting by means of the same operating mechanism a second closure of said relay circuit thereby effecting a second operation of said switch contact members.

CHARLES T. JACOBS.